United States Patent [19]

Shimoda et al.

[11] Patent Number: 5,223,759
[45] Date of Patent: Jun. 29, 1993

[54] DC BRUSHLESS MOTOR WITH SOLID ROTOR HAVING PERMANENT MAGNET

[75] Inventors: Tatsuya Shimoda; Takeshi Seto; Kenichi Endo, all of Nagano, Japan

[73] Assignee: Seiko Epson Corporation, Tokyo, Japan

[21] Appl. No.: 676,963

[22] Filed: Mar. 29, 1991

Related U.S. Application Data

[63] Continuation-in-part of Ser. No. 286,365, Dec. 16, 1988, Pat. No. 5,006,045.

[30] Foreign Application Priority Data

| Dec. 24, 1987 | [JP] | Japan | 62-327798 |
| Nov. 8, 1988 | [JP] | Japan | 63-280301 |
| Nov. 8, 1988 | [JP] | Japan | 63-280302 |
| Jul. 12, 1990 | [JP] | Japan | 2-184491 |

[51] Int. Cl.⁵ .......... H02K 15/03; H02K 15/06; H02K 01/27
[52] U.S. Cl. .......... 310/156; 310/42; 310/181; 310/262; 29/598
[58] Field of Search .......... 310/156, 181, 187, 261, 310/262, 263, 271, 190, 193, 217, 218, 269, 42, 43, 44, 45; 29/598

[56] References Cited

U.S. PATENT DOCUMENTS

| 3,375,385 | 3/1968 | Young | 310/261 |
| 3,492,520 | 1/1970 | Yates | 310/261 |
| 4,139,790 | 2/1979 | Steen | 310/156 |
| 4,144,469 | 3/1979 | Miyashita et al. | 310/156 |
| 4,159,434 | 6/1979 | Kalsi | 310/168 |
| 4,322,648 | 3/1982 | Ray et al. | 310/156 |
| 4,469,970 | 9/1084 | Neumann | 310/156 |
| 4,568,846 | 2/1986 | Kapadia | 310/156 |
| 4,658,165 | 4/1987 | Vandershaeghe | 310/156 |
| 4,760,300 | 7/1988 | Yoshida et al. | 310/211 |
| 4,795,936 | 1/1989 | Crosetto et al. | 310/156 |
| 4,845,837 | 7/1989 | Lloyd | 29/598 |
| 4,981,635 | 1/1991 | Yamashita et al. | 264/112 |
| 5,006,045 | 4/1991 | Shimoda et al. | 417/42 |

*Primary Examiner*—Steven L. Stephan
*Assistant Examiner*—D. R. Haszko
*Attorney, Agent, or Firm*—Kanesaka & Takeuchi

[57] ABSTRACT

A DC brushless motor which includes a hollow cylindrical stator (2) having a plurality of exciting coils (6) secured to an inside thereof; a solid cylindrical rotor (7) provided within the stator and having at least two permanent magnets (30) therein so as to form a magnetic circuit with the stator; a rotary shaft (8) secured concentrically with said rotor; and a pair of bearings (10, 12) secured to opposite ends of the stator for supporting the rotary shaft for rotation. The permanent magnet is placed between a pair of high permeability yoke portions or pole pieces each extending in a radial direction to form a magnetic circuit and made of a rare earth element-transition metal-boron alloy.

8 Claims, 11 Drawing Sheets

DC BRUSHLESS MOTOR WITH SOLID ROTOR HAVING PERMANENT MAGNET

CROSS-REFERENCE TO RELATED APPLICATIONS

This is a continuation-in-part application of Ser. No. 286,365 filed Dec. 16, 1988 now U.S. Pat. No. 5,006,045 issued on Apr. 9, 1991.

BACKGROUND OF THE INVENTION

1. Field of the Invention

The present invention relates to DC brushless motors for high speed rotation with high efficiency.

2. Description of the Prior Art

Figure 14:
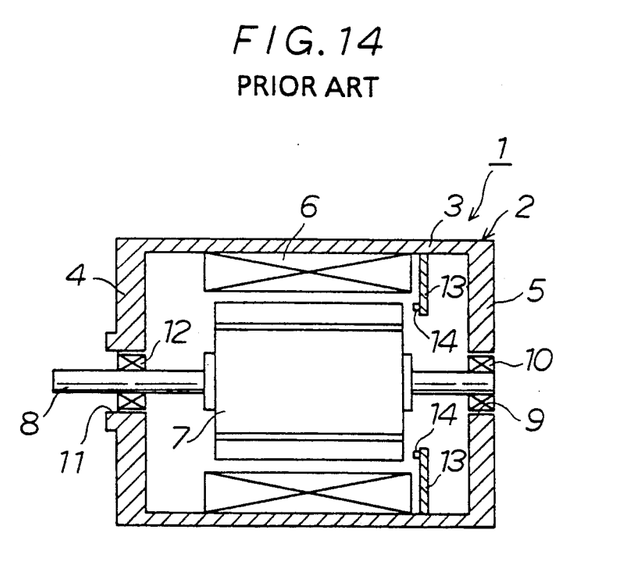
FIG. 14 is a longitudinal section of a conventional DC brushless motor.

FIG. 14 shows a conventional DC brushless motor 1 including a motor case or stator 2 which has a cylindrical side wall 3 and a pair of end walls; i.e., a front wall 4 and a rear wall 5, for closing the ends of the side wall 3. A plurality of exciting coils 6 are fixedly arranged on the inside of the side wall 3 in the form of a cylinder. A rotary shaft 8 extends outwardly from opposite ends of a rotor 7 in concentric relation to the rotor 7 and is supported for rotation by a pair of bearings 10 and 12 which are fitted in holes 9 and 11 of the rear wall 5 and the front wall 4, respectively. An annular support member 13 is provided within the motor case 2 to support a plurality of magnetic pole sensors 14 in the vicinity of the circumference of the rotor 7.

Figure 15:
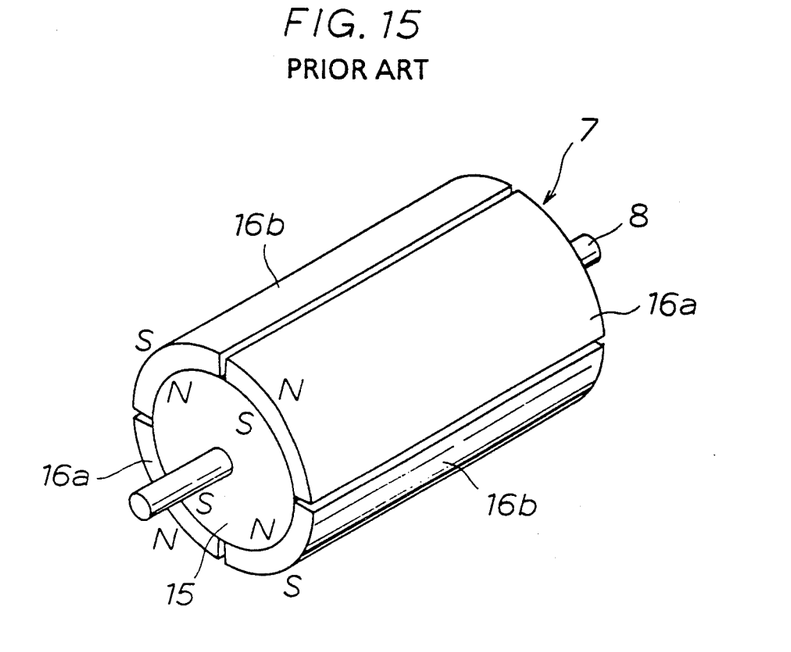
FIG. 15 is a perspective view of a rotor for the conventional motor.

FIG. 15 shows the conventional rotor 7 including a cylindrical yoke 15 into which the rotary shaft 8 is put as a unit. A pair of arcked permanent magnets 16a with the N pole on the outside and the S pole on the inside and a pair of arcked permanent magnets 16b with the N pole on the inside and the S pole on the outside are bonded to the cylindrical yoke 15 so that their poles are arranged alternately.

In operation, the magnetic pole sensors 14 of the DC brushless motor 1 detect the magnetic pole position of the rotor 7, and a control circuit (not shown) conducts electric current through the corresponding exciting coil 6 to rotate the rotor 7 by the interaction between the electric current and the magnetic flux. The magnetic pole sensors 14 detect again the magnetic pole position of the rotated rotor 7, and the control circuit supplies electric current to a different exciting coil 6 to rotate again the rotor 7. The above operation is repeated to continuously rotate the rotor 7, the rotary power of which is taken out via the rotary shaft 8 of the motor 1.

Figure 16:
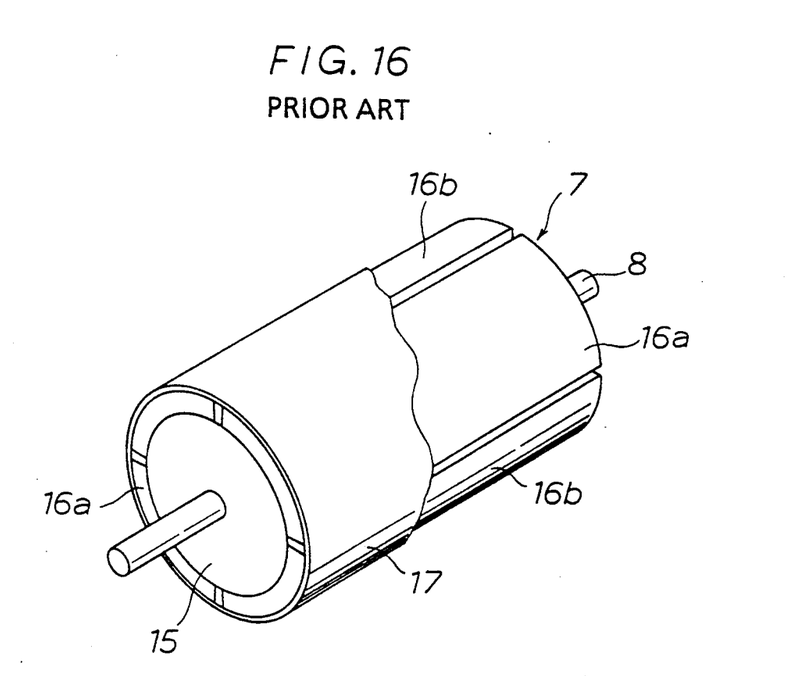
FIG. 16 is a perspective view of a rotor with a protective member.

As FIG. 16 shows, a protective member 17 made of a non-magnetic metal is provided to cover the arcked permanent magnets 16a and 16b for preventing the permanent magnets 16a and 16b from being pulled off from the rotor 7 by a large centrifugal force resulting from high speed rotation of the motor 1.

However, the maximum energy product and residual magnetic flux density of DC brushless motors using ferrite magnets are as small as 3.3 MGOe and 3.8 KG, respectively, so that it is necessary to raise the permeance of the magnetic circuit in order to produce satisfactory torque to drive the motor. For this reason, a large amount of magnet is required, making the motor size very large.

When the stress caused by the centrifugal force resulting from high speed rotation becomes greater than the material and bonding strengths of the permanent magnets of a scroll type compressor, the permanent magnets can be broken up and scattered.

When a protective member is used to cover the rotor in order to prevent the permanent magnets from being scattered, not only the manufacturing process is complicated but also the space between the rotor and the stator is increased by that much. Consequently, the magnetic resistance increases while the magnetic density decreases, resulting in the reduced efficiency.

SUMMARY OF THE INVENTION

Accordingly, it is an object of the invention to provide a compact and efficient DC brushless motor.

It is another object of the invention to provide a DC brushless motor with the permanent magnets which highly resistant to breaking up and scattering at high speed rotation.

According to an aspect of the invention there is provided a DC brushless motor which includes a hollow cylindrical stator having a plurality of exciting coils secured to an inside thereof; a solid cylindrical rotor provided within the stator and having at least two permanent magnets therein so as to form a magnetic circuit with the stator; a rotary shaft secured concentrically with the rotor; a pair of bearings secured to opposite ends of the stator for supporting the rotary shaft for rotation; and the permanent magnets being placed between a pair of high permeability yoke portions or pole pieces each extending in a radial direction to form a magnetic circuit.

According to another aspect of the invention there is provided a DC brushless motor which includes a hollow cylindrical stator having a plurality of exciting coils secured to an inside thereof; a solid cylindrical rotor provided within the stator and having a cylindrical yoke with a shaft opening and an annular permanent magnet joined in solid phase with the cylindrical yoke; a rotary shaft fitted into the shaft opening concentric with the rotor; a pair of bearings secured to opposite ends of said stator for supporting said rotary shaft for rotation; and the permanent magnet being made of a rare earth-iron-boron alloy.

According to still another aspect of the invention, there is provided a DC brushless motor which includes a hollow cylindrical stator having a plurality of exciting coils secured to an inside thereof; a solid cylindrical rotor provided within the stator and having a pair of permanent magnets, each joined in solid phase with a pair of yoke portions made from a high permeability material and an auxiliary yoke with a shaft opening, the auxiliary yoke being joined with the yoke portions to form a rotor unit; a rotary shaft fitted into the shaft opening in concentric with the rotor; a pair of bearings secured to opposite ends of the stator for supporting the rotary shaft for rotation; and the permanent magnet is made of a rare earth-iron-boron alloy.

The above and other objects, features, and advantages of the invention will be more apparent from the following description when taken in conjunction with the accompanying drawings.

DESCRIPTION OF THE PREFERRED EMBODIMENT

Figure 1:
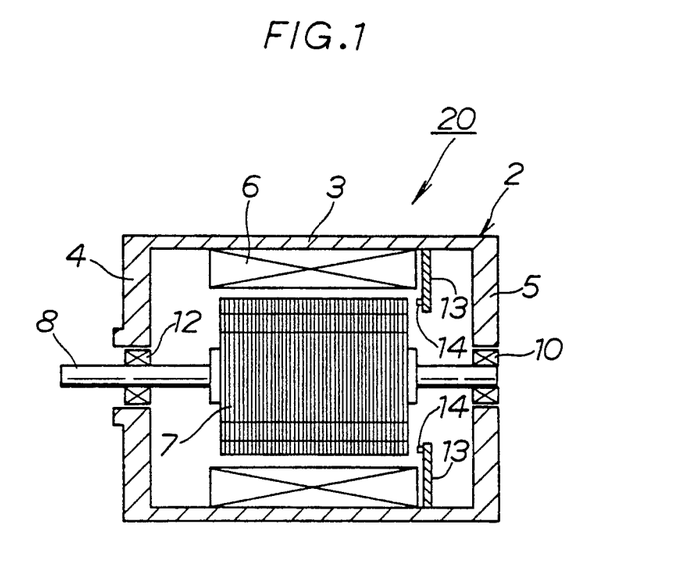
FIG. 1 is a longitudinal section of a DC brushless motor to an embodiment of the invention.

In FIG. 1, a DC brushless motor 20 includes a motor case or stator 2 which has a cylindrical side wall 3, a front wall 4, and a rear wall 5. A plurality of exciting coils 6 are fixedly arranged on the inside of the side wall 3 in the form of a cylinder. A rotary shaft 8 is secured to the center of a rotor 7 so that it is concentric with the rotor 7. Opposite ends of the rotary shaft 8 are supported for rotation by bearings 11 and 12 mounted on the rear wall 5 and the front wall 4, respectively. An annular support member 13 is provided within the case 2 to support a plurality of magnetic pole sensors 14 in the vicinity of a circumference of the rotor 7.

In operation, the magnetic pole sensors 14 detect the magnetic pole position of the rotor 7, and a control circuit (not shown) conducts electric current through the corresponding exciting coil 6 to rotate the rotor 7 by the interaction between the electric current and the magnetic flux. The magnetic pole sensors 14 detect again the magnetic pole position of the rotated rotor 7, and the control circuit supplies electric current to a different exciting coil 6 to rotate again the rotor 7. The above operation is repeated to continuously rotate the rotor 7, the rotary power of which is taken out via the rotary shaft 8.

Figure 2:
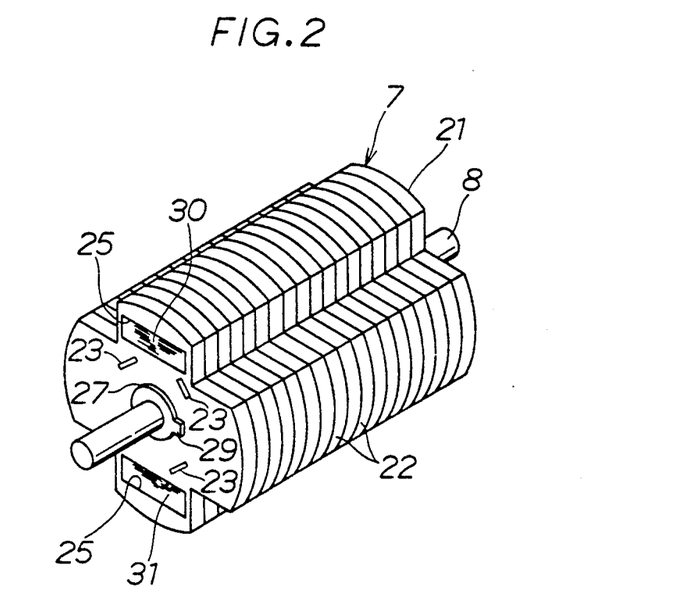
FIG. 2 is a perspective view of a rotor useful for the motor of FIG. 1.

In FIG. 2, a yoke 21 of the rotor 7 is made by laminating a plurality of silicon steel plates 22 in the axial direction of the rotary shaft 8 and pressing them in the axial direction so that the rectangular eyelets 23 fitted into the rectangular eyelets of the next steel plates 22, thus forming a unit.

Figure 3:
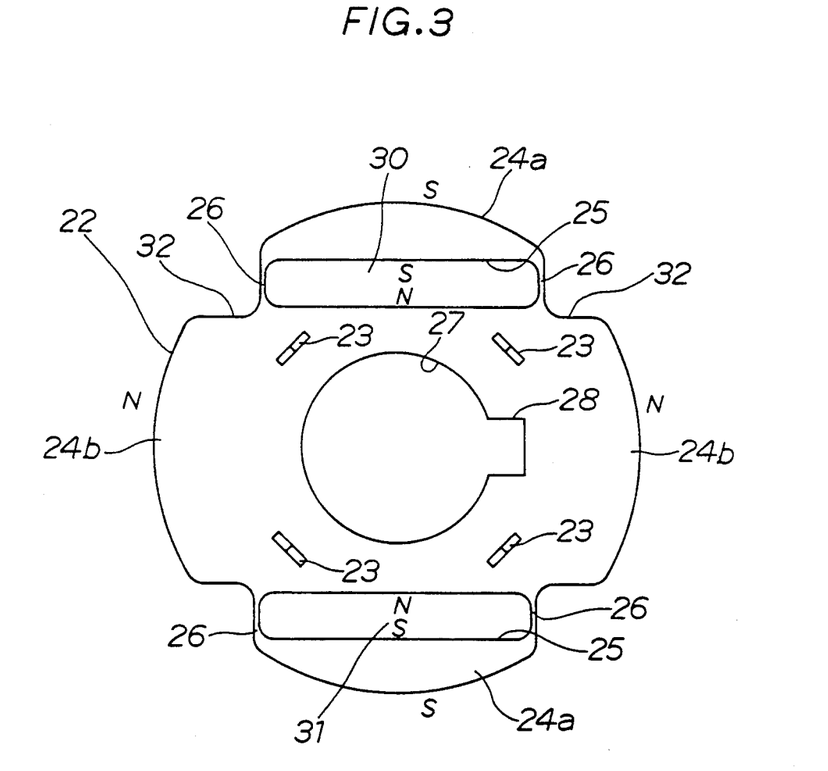
FIG. 3 is a top plan view of a silicon steel rotor plate useful for the rotor of FIG. 2.

In FIG. 3, the silicon steel plates 22 are made from a high permeability material so as to have four magnetic poles or pole pieces 24a and 24b extending radially outwardly at right angles with each other and having an arcked end face. A pair of slots 25 are provided on opposite magnetic poles 24a at equal distance from the center for receiving permanent magnets 30 and 31. The peripheral and central portions of the magnetic pole 24a are connected with bridge portions 26. A shaft opening 27 with a keyway 28 is provided at the center of the steel plate 22 for receiving the rotary shaft 8. Each steel plate 22 is coated with an inorganic dielectric material to make a total thickness of either 0.35 mm or 0.50 mm. Alternatively, the silicon steel plates 22 may be replaced by cold rolled steel plates to form the yoke 21.

The rotary shaft 8 has an expanded intermediate portion such that it fitted closely into the shaft opening 27 of the yoke 21 which is made up of laminated steel plates 22. The intermediate portion has a key 29 which engages the keyway 28 to prevent relative rotation between the rotor 7 and the shaft 8. A pair of permanent magnets 30 and 31 are fitted in the slots 25 such that the N poles face each other. Consequently, the N poles of the permanent magnets 30 and 31 repulse each other so that the magnetic poles 24a and 24b are magnetized as the S pole and the N pole, respectively, thus constituting a four pole rotor.

Figure 4:
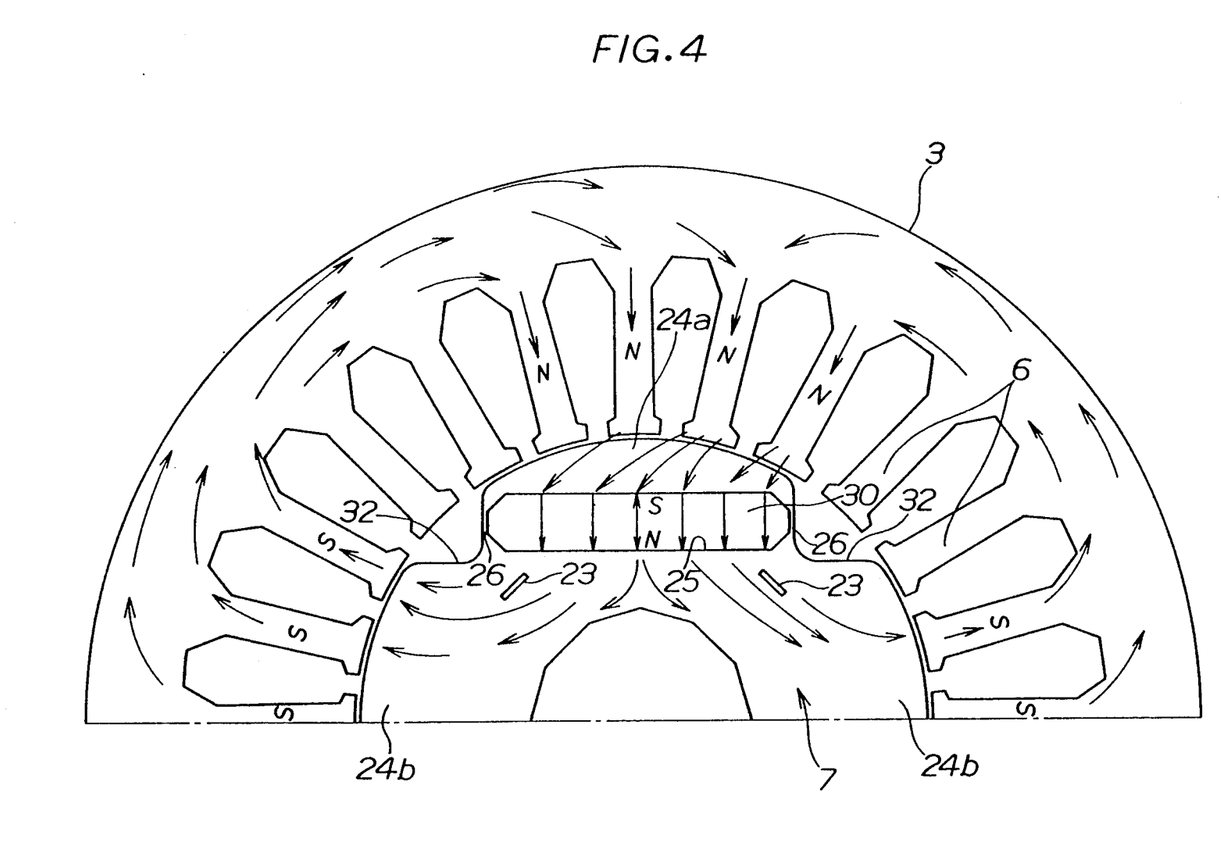
FIG. 4 shows lines of magnetic force within the motor.

In FIG. 4, the width of the bridge portions 26 is so small that the magnetic flux density readily reaches its saturation level. Consequently, very few lines of magnetic force pass through the bridge portions 26 from the N pole to the S pole. Four notches or air gaps 32 are provided between the adjacent poles 24a and 24b so that the lines of magnetic force run from the N pole 24b to the S pole 24a through the exciting coils 6 as shown. The rectangular eyelets 23 are placed at an angle of 45 degrees to the magnetic poles so as to avoid interference with the magnetic lines.

In this way, according to the invention, by providing a plurality of radially extending magnetic poles and a slot on every other pole and placing permanent magnets in the slots such that the same magnetic poles face each other it is possible to make the number of magnetic poles of the rotor twice that of the permanent magnets by making use of the repulsion between like magnetic poles. Since the permanent magnets are placed in the slots provided between the high permeability peripheral and central portions of a yoke, they are prevented from being scattered because of high speed rotation, thus eliminating the need for any protective member which covers the rotor and thus the iron loss caused by the protective member. Since the yoke is made up of laminated steel plates, the iron loss is minimized. The permanent magnets have a simple form and do not require high precision surface finish, making the manufacture thereof very easy.

Figure 5:
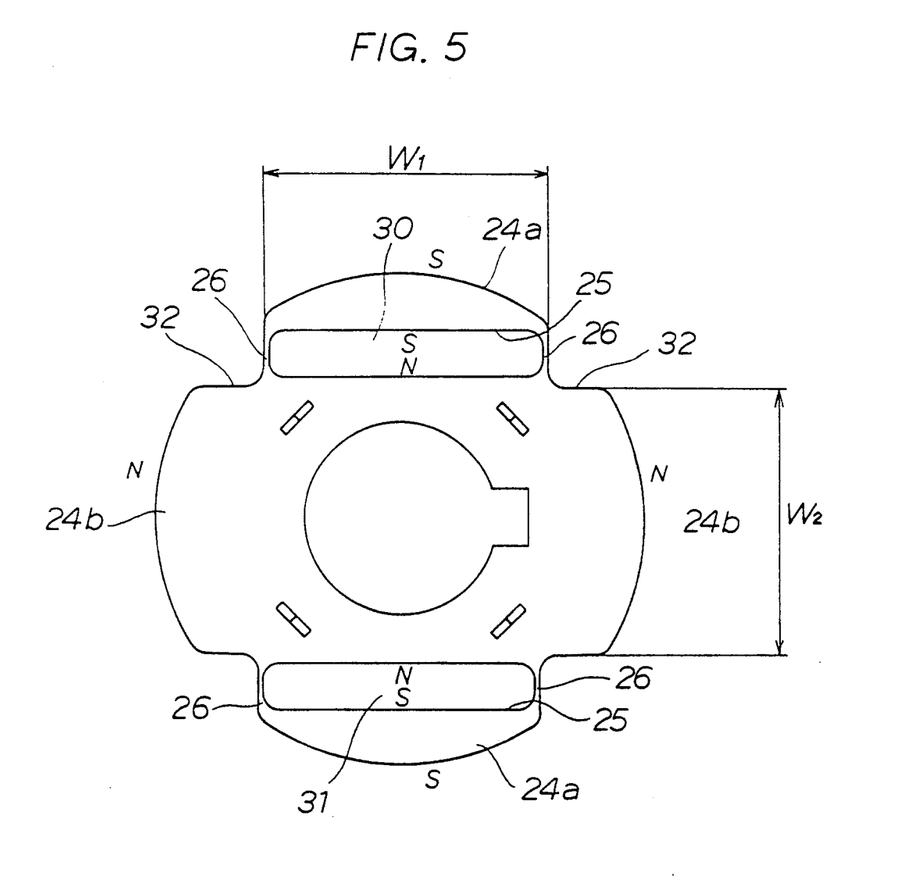
FIG. 5 is a top plan view of a rotor plate according to another embodiment of the invention.

In FIG. 5, some lines of magnetic force from the N pole of the permanent magnet 30 return to the S pole without passing through the magnetic pole 24b (flux leakage) so that the flux of the magnetic pole 24a is higher than that of the magnetic pole 24b when the width $W_1$ of the magnetic pole 24a is equal to the width $W_2$ of the magnetic pole 24b. For this reason, according to the invention, the width $W_2$ of the magnetic pole 24b is made greater than that of the magnetic pole 24a so that the flux of the magnetic poles 24a and 24b become equal, thereby producing uniform torque.

Figure 6:
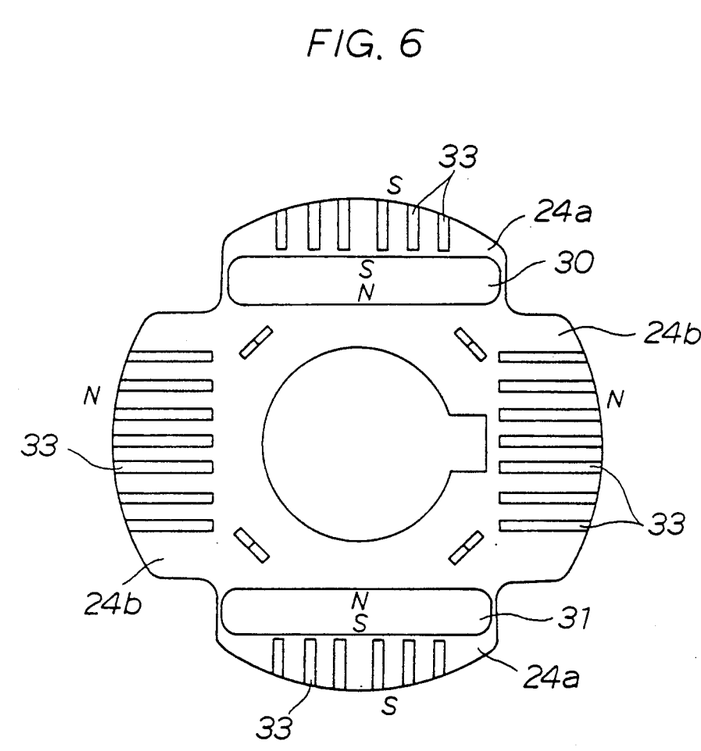
FIG. 6 is a top plan view of a rotor plate according to still another embodiment of the invention.

In FIG. 6, a number of slits 33 are provided on the magnetic poles 24a and 24b such that they are aligned in the same direction as the magnetic lines. Since the lines of magnetic force from the N pole of the permanent magnet take the shortest path to the S pole, the magnetic flux density in opposite sides of the magnetic pole 24a is higher than that of the central portion. Thus, the slits 33 force the lines of magnetic force to run along the slits 33 normal to the magnetic pole end faces.

Figure 7:
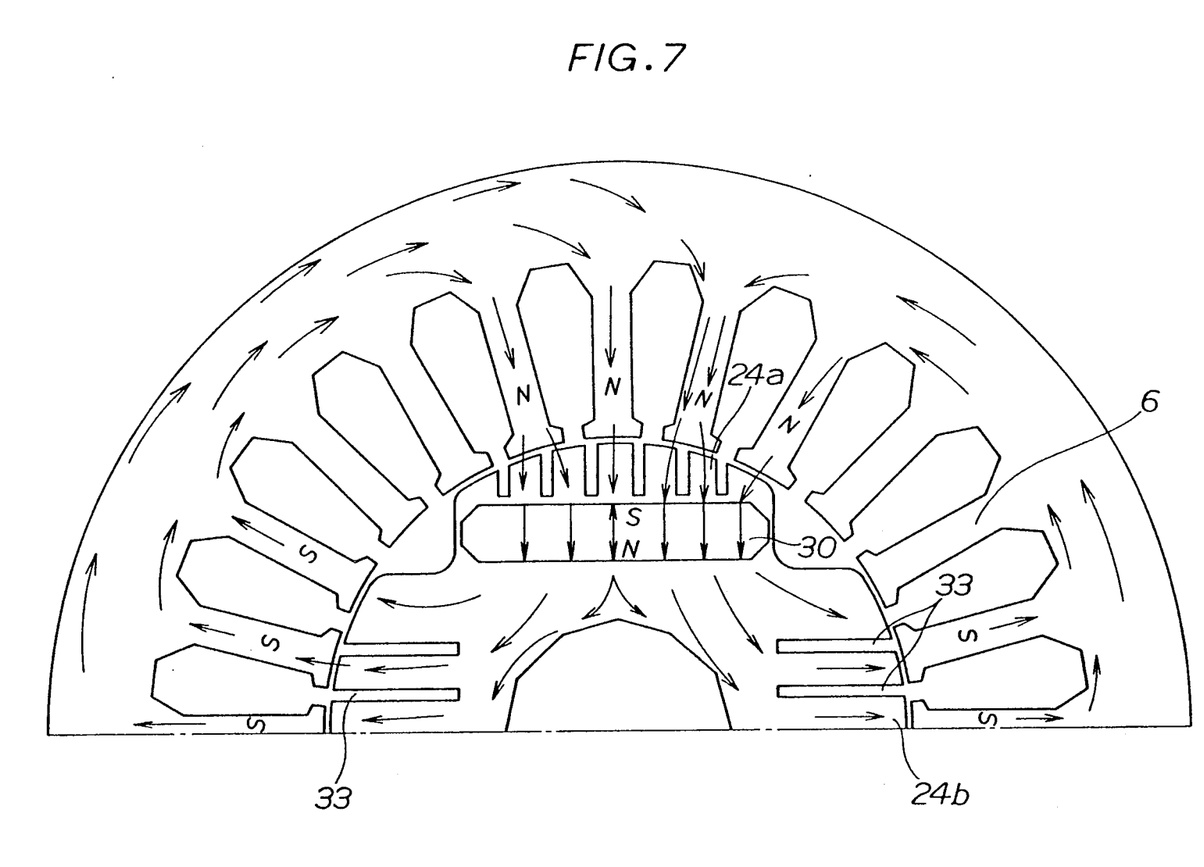
FIG. 7 shows lines of magnetic force within a motor us the rotor plates of FIG. 6.

In FIG. 7, the lines of magnetic force from the N pole of the permanent magnet 30 are guided by the slits 33 of the magnetic poles 24b to pass through the exciting coils 6 and by the slits 33 of the magnetic pole 24a to return to the S pole of the permanent magnet 30. Thus, the slits 33 make the distribution of the magnetic flux uniform across the magnetic pole, thus producing uniform torque. As a result, not only the heat distribution of the permanent magnet rotor is improved but also the cooling area is increased.

Figure 8:
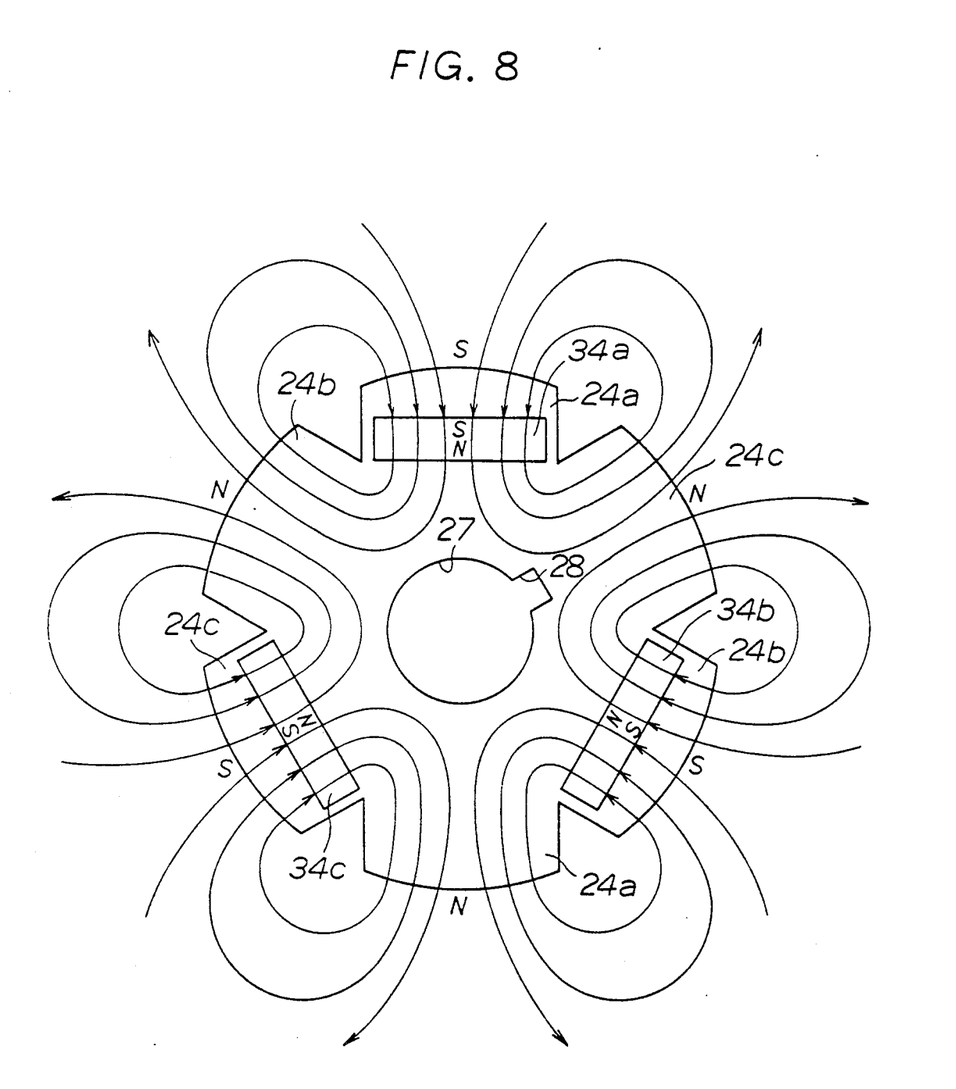
FIG. 8 is a top plan view of a rotor plate according to yet another embodiment of the invention.

In FIG. 8, six magnetic poles 24a, 24b, and 24c extend radially outwardly at 60 degrees to each other. Permanent magnets 34a, 34b, and 34c are fitted in every other magnetic poles with the N poles facing inwardly. A shaft opening 27 is provided at the center of the yoke 21 for receiving a rotary shaft. The shaft opening 27 has a keyway 28 to prevent relative rotation between the rotary shaft and the rotor. The magnetic flux from the N pole of a permanent magnet reaches the S pole through the adjacent poles as shown. Thus, the magnetic poles having a permanent magnet have a magnetic force of the S pole while the magnetic poles having no permanent magnet have a magnetic force of the N pole.

In this embodiment, cast magnets of a praseodymium alloy are used for the permanent magnets, but cast magnets of alnico or praseodymium, sintered magnets of ferrite or rare earth, or resin bonded magnets of ferrite or rare earth may be used. The permanent magnets are made in the form of a rectangular parallelepiped, the depth of which in the axial direction of the rotor is made between two and five times the width. This form is much easier to make than conventional arcked permanent magnets. Since they are not bonded to the yoke, it is possible to omit the precision surface finish. Since the permanent magnets are fitted into the slots 25 provided between the peripheral and central portions of a yoke, the magnets are prevented from being scattered by the centrifugal force and are useful for high speed motors. The silicon steel plates 22 of the yoke 21 are stamped so that the productivity is very high. Also, it is possible to make high precision rotors, thus providing efficient motors.

According to another embodiment of the invention, the permanent magnets of a DC brushless motor are made of an alloy of a rare earth metal, a transition metal, and boron. The alloy is made by kneading and granulating a magnet composition consisting of 98.5 percent by weight of a magnet powder having a percent composition by atomic weight of $$Nd_{14}Fe_{76}Co_4B_6$$

and particle diameters between one and 44 micrometers and 1.5 percent by weight of an epoxy resin. The granules are then loaded in metal molds at room temperature and subjected to a compression molding process. The resin is hardened by heat to provide shaped permanent magnets 30, 31, 34a, 34b, and 34c. The magnetic performance of the resulting moldings is measured as shown in Table 1 below.

TABLE 1

| (BH)max(MGOe) | bHc(KOe) | Br(KG) |
|---|---|---|
| 8.9 | 5.3 | 6.6 |

The corrosion and heat resistance, which has been low for the neodymium-iron-boron system, is improved satisfactorily because of the resin bond.

According to still another embodiment of the invention, the permanent magnets 30, 31, 34a, 34b, and 34c are made of a rare earth composition including at least one rare earth element selected from the group consisting of rare earth elements including yttrium, a transition metal and boron. The alloy composition is shown in Table 2 below.

TABLE 2

| Composition | $Pr_{17}Fe_{76.5}Cu_{1.5}B_5$ |
|---|---|

In order to make a rotor 7, a rare earth element, a transition metal, and boron are weighed and melt cast in an induction furnace. The cast ingot is then pulverized into particles having an average particle diameter of five micrometers (by a Fischer's subsieve sizer), mixed with a Freon gas, and then formed to provide a temporary annular magnet having an outside diameter of 100 mm, an inside diameter of 40 mm, and a thickness of 30 mm.

Figure 9:
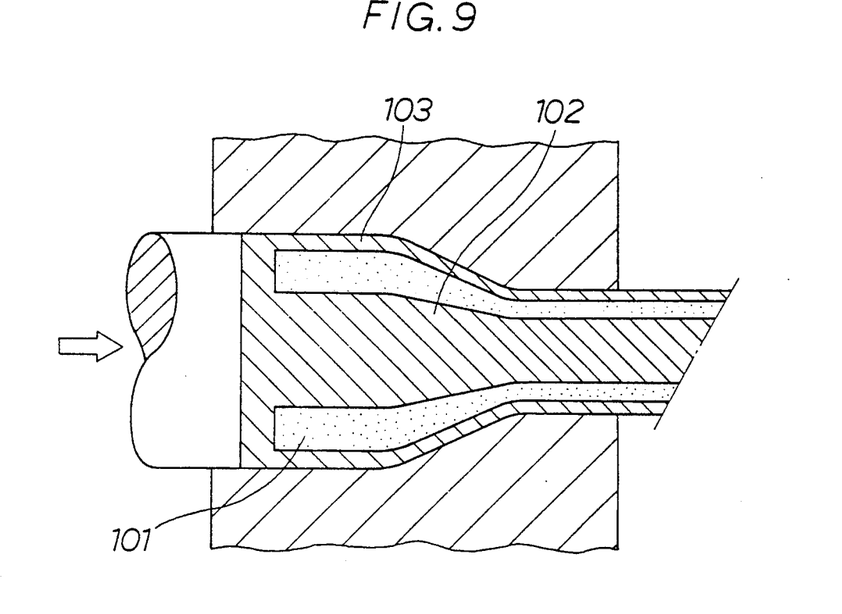
FIG. 9 is a sectional view of part of an excluder according to an embodiment of the invention.

As FIG. 9 shows, a column 102 of soft magnetic material, such as pure iron, is fitted into the annular magnet 101 while a pipe 103 of SUS 304 having a thickness of 20 mm, with the inside coated with boron nitride is fitted over the annular magnet 101. After degassed, the pipe is closed at the both ends and pushed into an excluder so that the thickness of the pipe 103 is reduced to 10% of the original. Then, it is subjected to a heat treatment at 1000 degrees C. for 24 hours.

Figure 10:
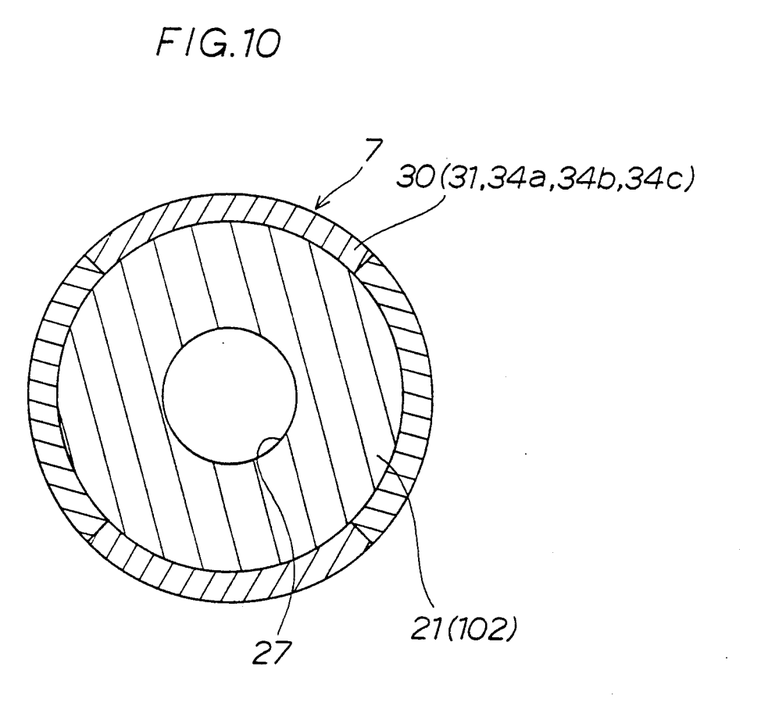
FIG. 10 is a cross section of a rotor made by the excluder of FIG. 9.

As FIG. 10 shows, the pipe 103 is removed, and a shaft opening 27 is bored at the center of the soft magnetic column 102 or the yoke 21. Then, a rotary shaft 8 is press fitted into the shaft opening 27 to make a rotor 7.

Examples of the useful rare earth elements include yttrium, lanthanum, cesium, praseodymium, neodymium, scandium, europium, gadolinium, terbium, dysprosium, holmium, erbium, thulium, ytterbium, and lutetium. Praseodymium gives the highest magnetic characteristic values. One, or two or more elements of these are used in combination. Examples of the useful transition metals include iron, nickel, and copper. One, or two or more elements among these elements are used in combination. Small amounts of an addition element, such as dysprosium, terbium, aluminum, silicon, molybdenum, gallium, indium, silver, and gold, is useful for enhancing the coercive force.

The magnetic characteristics of the rotor 7 made by the above method are given in Table 3 below.

TABLE 3

| Direction | (BH)max(MGOe) | iHc(KOe) |
|---|---|---|
| r direction | 20.5 | 10.5 |
| u direction | 20.5 | 10.5 |
| z direction | 5.0 | 5.0 |

Table 3 shows that the permanent magnets 30, 31, 34a, 34b, and 34c are anisotropic and have high magnetic characteristic values in the r (radial) and u (circumferential) directions. Since they are hot worked at 900 degrees C, the permanent magnets have been joined in solid phase with the soft magnetic yoke 102. As a result, not only the permanent magnets are not separated from the yoke during high speed rotation but also the soft magnetic materials reinforce the permanent magnets. Since no powder process is used, the strength of the resultant magnets is larger than that of the conventional ferrite magnets. As Table 1 shows, the magnetic properties are so excellent that it is sufficient to use small amounts of the magnet, making the rotor compact and light weight. As a result, the centrifugal force acting on the magnets is reduced, making the rotor more reliable at high speed. The magnets not only are useful for high speed scroll type compressors but also make it possible to reduce the size and weight of the compressors.

According to yet another embodiment of the invention, the magnets 30, 31, 34a, 34b, or 34c and the yoke 21 such as shown in FIG. 10 are made as a unit by a rearward exclusion process as follows:

The composition of Table 2 is melt and cast in an induction furnace to provide a cast ingot. The cast ingot is then pulverized into an average particle diameter of five micrometers (by Fischer's subsieve sizer) and put into a graphite mold to form a magnet molding having an outside diameter of 60 mm and a height of 40 mm.

Figure 11:
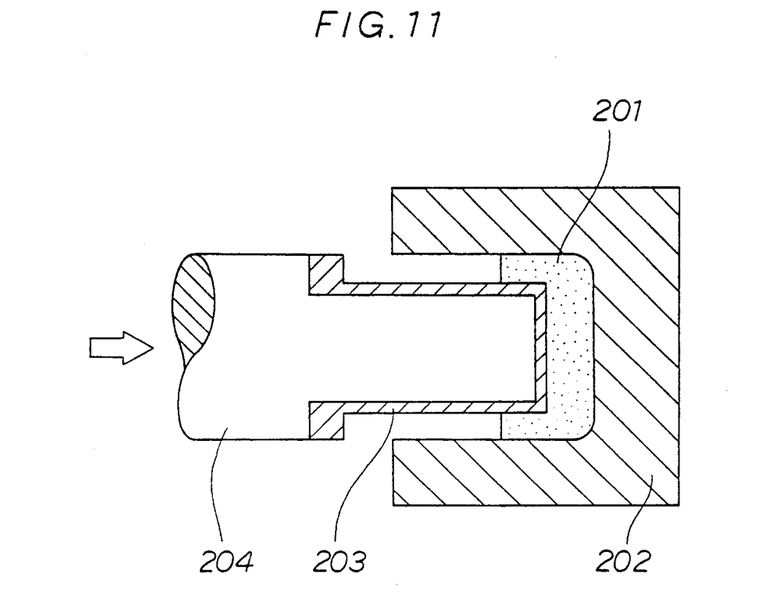
FIG. 11 is a sectional view of a rearward excluder according to another embodiment of the invention.

As FIG. 11 shows, the magnet molding 201 is put into a mold 202, and a mandrel 204 having an outside diameter of 52 mm and a flanged shell 203 fitted over the front end is pushed in the direction of an arrow at 900 degrees C. in an argon atmosphere so that the magnet molding 201 is excluded out in a direction opposite to the above arrow direction to provide a radially oriented annular magnet. The exclusion ratio in cross section area of the magnet before the exclusion to the magnet after the exclusion was about four. Then, the shell with the magnet is removed from the mandrel, and the tip of the shell is cut off. A rotary shaft 8 is press fitted into the finished magnet with the shell. Alternatively, the rotary shaft 8 may be secured to the magnet with screws.

Since the rotor 7 is made by hot working at 900 degrees C. in an argon atmosphere, the magnet is joined in solid phase with the yoke, thereby making bonding strength sufficiently high to withstand the centrifugal force at high speed rotation of the motor. The magnetic forces measured in the r (radial) direction, u (circumferential) direction, and z (axial) direction are shown in Table 4 below.

TABLE 4

| Direction | (BH)max(MGOe) | iHc(KOe) |
|---|---|---|
| r direction | 30.5 | 12.5 |
| u direction | 5.3 | 6.3 |
| z direction | 3.5 | 5.0 |

Table 4 indicates that the rotor having the highest magnetic characteristic values in the r direction has been oriented radially by the rearward exclusion. The flange portion of the rotor is used so as to balance the eccentricity of a scroll member, thus making the structure simple.

Figure 12:
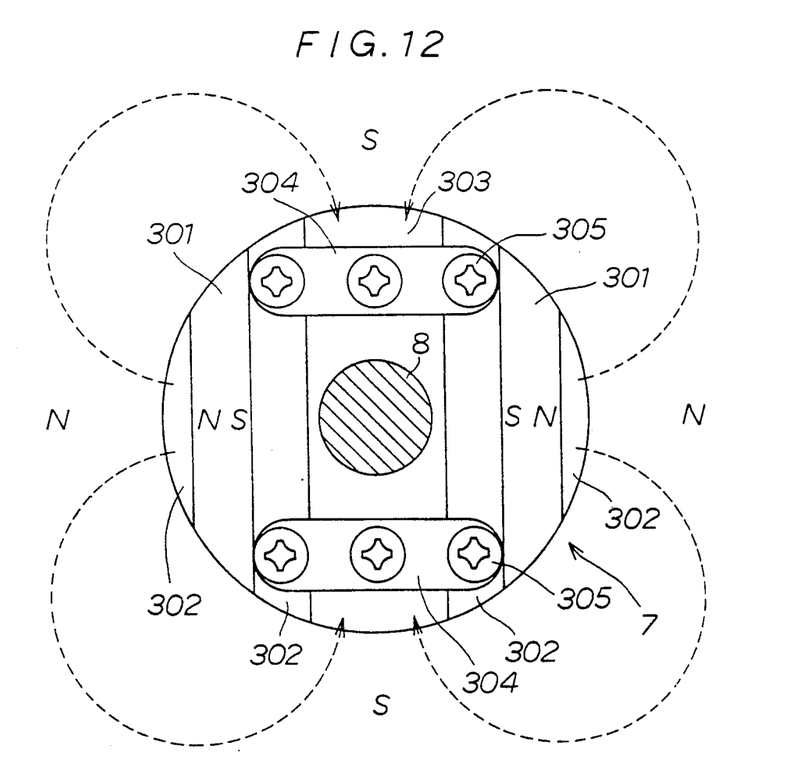
FIG. 12 is a front elevational view of a rotor according to still another embodiment of the invention.

According to another embodiment of the invention, the rotor 7 is made so as to have such a structure as shown in FIG. 12. The rotor 7 includes a pair of magnets 301 made of a rare earth element, a transition metal, and boron, two pairs of main yokes 302 joined in solid phase with the permanent magnets by hot rolling, and an auxiliary yoke 303 secured to the main yokes 302 with a pair of tie-plates 304 and setscrews 305. A rotary shaft 8 is press fitted into a shaft opening of the auxiliary yoke 303. The permanent magnets 301 are placed such that the S poles face each other. Consequently, the rotor 7 has four magnetic poles; two S poles on the end faces of the auxiliary yoke 303 and the main yoke 302 which is joined with the auxiliary yoke 303 and tow N poles on the main yoke 302 joined in solid phase with the permanent magnet 301 on the side of the N pole.

Figure 13:
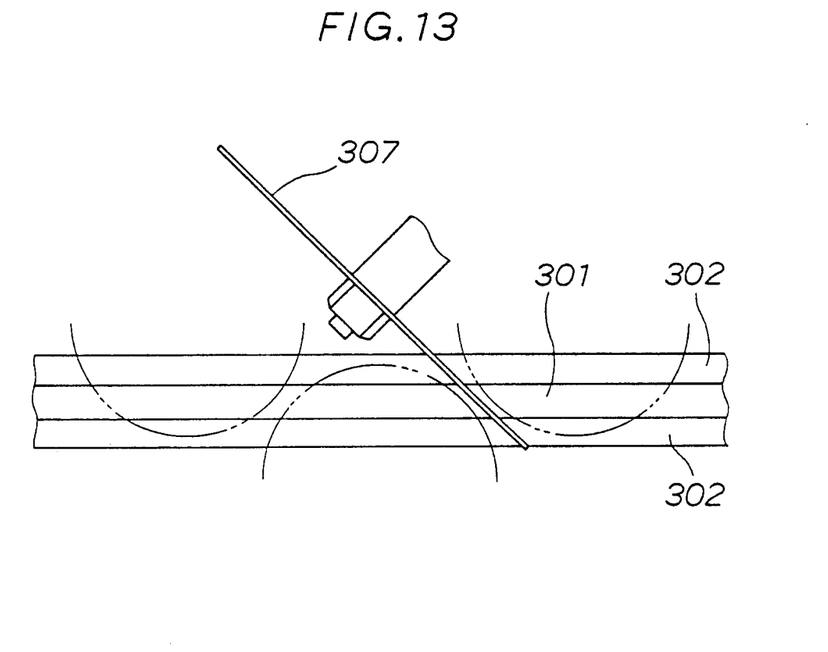
FIG. 13 is a diagram showing a solid phase plate of permanent magnet and main yoke useful for the rotor of FIG. 12

Such a rotor 7 is made as follows: A magnet alloy of the composition of Table 2 is melt and cast into a mold made of a soft magnetic material such as pure iron. After cooling, it is heated to 950 degrees C. and subjected to hot working. Then, it is subjected to a heat treatment to provide a solid-phase joined plate of a permanent magnet 301 between a pair of main yokes 302 as shown in FIG. 13. The magnetic measurements of the permanent magnet 301 are given in Table 5 below.

TABLE 5

| iHc | Br | (BH)max |
|---|---|---|
| 9.5 | 10.3 | 30.0 |

The solid-phase joined plate is cut into the form of a trapezoid with a slicer 307. The main yokes 302 on the central side are joined to the auxiliary yoke 303 with the tie-plates 304 as described above. The assembled rotor is ground to the desired diameter to provide a rotor 7 which is magnetized by the repulsive magnetic fields.

In this embodiment, the magnet is hot rolled along with the mold, but the substantially same results may be obtained by putting the cast ingot into a sheath made of a soft magnetic material and then subjected to hot rolling.

According to still another embodiment of the invention, an alloy of the composition in the following Table 6 is put in a vacuum melt spinning device, which is widely used for making amorphous alloys, to make a quenched thin sheet having a thickness of about 30 micrometers. The thin sheet is then hot pressed to form a bulk. The bulk is then subjected to the aforementioned rearward exclusion to make a permanent magnet rotor in which the radially oriented magnets are joined in solid phase with the yokes.

TABLE 6

| Composition | $Nd_{15}Fe_{77}B_8$ |
|---|---|

As has been described above, the rotor of a DC brushless motor is made from a permanent magnet consisting of a rare earth element, a transition metal, and boron so as to provide high magnetic characteristics, which makes it possible to not only provide a compact motor but also increase the strength, thereby preventing the rotor from being broken up by the centrifugal force at high speed rotation.

We claim:

1. A DC brushless motor comprising:
   a hollow cylindrical stator having a plurality of exciting coils secured to an inside of said stator;
   a solid cylindrical rotor provided within said stator and having a cylindrical yoke and an annular permanent magnet joined in solid phase with said yoke for forming a magnetic circuit with said stator;
   a rotary shaft secured concentrically with said rotor;
   a pair of bearings secured to said stator for supporting said rotary shaft at opposite ends for rotation;
   said permanent magnet being made of a rare earth-iron-boron alloy.

2. The DC brushless motor of claim 1, wherein said permanent magnet is made from an anisotropic magnet which is made by hot working a praseodymium-iron-boron or neodymium-iron-boron alloy.

3. The DC brushless motor of claim 1, wherein said permanent magnet is made by molding a magnet composition which consists of a magnet powder having a percent composition by atomic weight of $Nd_{14}Fe_{76}Co_4B_6$ and particle diameters between one and 44 micrometers and an epoxy resin.

4. A DC brushless motor comprising:
- a hollow cylindrical stator having a plurality of exciting coils secured to an inside thereof;
- a solid cylindrical rotor provided within said stator and having a pair of permanent magnets, each joined in solid phase with a pair of main yokes on opposite sides, and an auxiliary yoke with a shaft opening, said auxiliary yoke being joined with said main yoke to form a rotor unit;
- a rotary shaft fitted into said shaft opening in concentric with said rotor;
- a pair of bearings secured to opposite ends of said stator for supporting said rotary shaft for rotation; and said permanent magnet being made of a rare earth-iron-boron alloy.

5. The DC brushless motor of claim 4, wherein said permanent magnet is made from an anisotropic magnet which is made by hot working a praseodymium-iron-boron or neodymium-iron-boron alloy.

6. The DC brushless motor of claim 4, wherein said permanent magnet is made by molding a magnet composition which consists of a magnet powder having a percent composition by atomic weight of $Nd_{14}Fe_{76}Co_4B_6$ and particle diameters between one and 44 micrometers and an epoxy resin.

7. The DC brushless motor of claim 1, wherein said yoke and said permanent magnet are joined in solid phase by putting an annular permanent magnet over a cylindrical soft magnetic body and extruding said permanent magnet-soft magnet body.

8. The DC brushless motor of claim 4, wherein said main yokes and said permanent magnet between said main yokes are joined in solid phase by hot rolling.

* * * * *